Patented Nov. 11, 1941

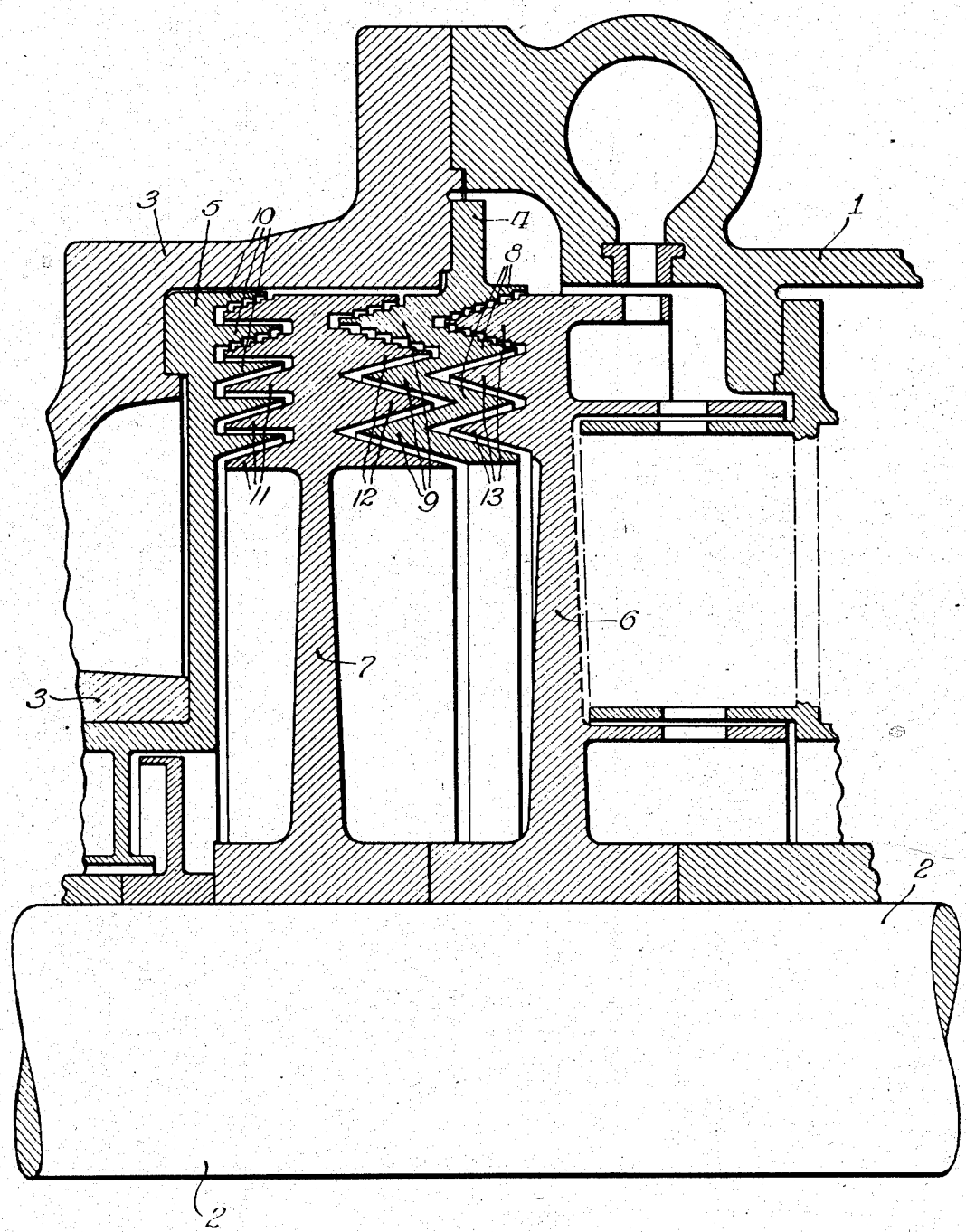

2,262,382

UNITED STATES PATENT OFFICE 2,262,382

LABYRINTH PACKING

Alfred Bierend, Berlin-Charlottenburg, Germany, assignor to Patentverwertungs-Gesellschaft mit beschrankter Haftung "Hermes," Berlin, Germany, a corporation of Germany Application July 24, 1939, Serial No. 286,159
In Germany July 25, 1938

2 Claims. (Cl. 286—10)

This invention relates in general to shaft packings of the labyrinth type, and more in particular to a labyrinth packing which is adapted for use in steam turbines. The object of the invention is to produce a new and improved packing of this character.

The invention is illustrated in the accompanying drawing, which shows the new labyrinth packing as used in sealing the shaft opening of a steam turbine.

Referring to the drawing, the reference character 1 indicates a portion of the casing of the turbine, while the reference character 2 indicates the shaft. A housing is indicated at 3, which serves to support the fixed parts of the packing. The housing may be secured to the turbine in any suitable manner.

The invention is concerned mainly with the shape of the cooperating fixed and rotating parts of the packing. The fixed parts comprise an inner annular disc 4 and an outer disc 5, while the rotating parts comprise the members 6 and 7 which are secured to the shaft 2.

Considering the annular disc 4 more in detail, it is provided on one side with a series of axially extending stepped rings 8 and on the other side with a similar series of axially extending stepped rings 9. The rings of one series alternate in a radial direction with the rings of the other series, and the construction is such that the annular recess between each pair of adjacent rings on one side of the disc extends into the base of the opposite ring on the other side. That is, the rings overlap axially of the shaft.

The outer disc 5 is provided with a series of axially extending rings 10, which are preferably stepped only on the inside circumference.

The rotating member 7 is provided with a series of axially extending stepped rings 11 which are adapted to cooperate with the rings 10 on the disc 5, and with a series of axially extending stepped rings 12 which are adapted to cooperate with the rings 9 on the disc 4. The rotating member 6 has a series of axially extending stepped rings 13 which are adapted to cooperate with the rings 8 on the disc 4.

Suitable packing material may be provided on the ring steps in known manner. In the case of any two cooperating stepped surfaces, however, preferably only the outer steps are provided with packing, the cooperating inner steps acting as counter-surfaces for such packing.

It will be seen that the invention provides a novel and advantageous labyrinth packing, characterized particularly by the use of an annular disc with stepped rings having a novel construction which is extremely economical of material and which at the same time enables the ring to perform its function in the packing in an efficient manner.

What is claimed is:

1. A labyrinth gland packing for a rotatable shaft, comprising a fixed annular disc surrounding the shaft in spaced relation thereto, said disc having concentric axially projecting stepped rings on each side thereof, the rings on one side being arranged alternately with those on the other side and in axially overlapping relation thereto, members secured to said shaft on opposite sides of said disc, and concentric axially projecting stepped rings on said members cooperating with the rings on said disc.

2. A labyrinth gland packing for a rotatable shaft, comprising a fixed annular disc surrounding said shaft in spaced relation thereto, said disc having a plurality of concentric stepped recesses formed in each side thereof, the recesses alternating on the two sides of the disc and being of such depth that they overlap axially of the shaft, members secured to said shaft on opposite sides of said disc, and concentric stepped rings on said members projecting axially within the recesses in said disc.

ALFRED BIEREND.